Patented Oct. 15, 1946

2,409,259

UNITED STATES PATENT OFFICE 2,409,259

PREPARATION OF CONJUGATED DIENES

Thomas F. Doumani, Wilmington, and Roland Deery, Long Beach, Calif., now by judicial change of name to Roland Frank Deering, assignors to Union Oil Company of California, Los Angeles, Calif., a corporation of California No Drawing. Application July 13, 1942, Serial No. 450,798

5 Claims. (Cl. 260—666)

This application relates to the production, purification, and utilization of the dimers of doubly unsaturated hydrocarbons, particularly the conjugated dienes such as butadiene, isoprene, cyclopentadiene and the like, and also to the production and purification of the corresponding monomers.

It is well known that dienes (diolefins) particularly the conjugated dienes, may readily be polymerized to form rubber, resins, and the gums which are so troublesome in cracked gasoline. Our invention resides in our discovery that under certain conditions even in dilute mixtures and those containing mono-olefins, these same dienes may be polymerized practically exclusively to the simplest polymer, namely the dimer, which in the case of butadiene for example, as a relatively stable colorless liquid boiling at about 130° C. Furthermore, invention resides in our discovery that this dimer may be almost quantitatively depolymerized to the original monomer. Invention also resides in the combination of these two steps as a means of concentration of the dienes.

The above discoveries open new fields of chemical utilization, such as the following:

(1) *Separation of dienes from mixtures.*—If for example, in a gaseous mixture containing butanes, butenes and butadiene, the butadiene is selectively dimerized, the remaining gases can be separated from the dimer by a simple fractional distillation or absorption process. Depolymerization of the dimer, followed by a final fractionation if necessary to remove small amounts of products of side reactions, will result in a product consisting of essentially pure butadiene. This process, in contrast to extraction and distillation processes, is readily applicable to mixtures containing as little as 5% or less of the desired diene.

(2) *Utilization of the diene dimers.*—Since the diene dimers are in general relatively stable liquids, they may be shipped and handled more readily than the monomers, which are in some cases gases or very volatile liquids. They may therefore be prepared in a number of plants and shipped to a central depolymerization plant if desired. The dimers may also be utilized as produced in many instances. For example, they may be used for further polymerization, or copolymerization with other chemicals to form resins, rubber, etc. They are useful also as chemicals or as chemical intermediates. In chemical production, the dimer is of outstanding value because of the relative ease of handling it, its ring structure, and the chemical reactivity of its two double bonds.

(3) *Combination processes.*—Since it is possible to depolymerize the diene dimers almost quantitatively to the monomers, it is no longer necessary that existing processes designed to produce the monomers, be operated so as to avoid production of the dimers. For example, production of butadiene by catalytic dehydrogenation of butenes has been carried on preferentially at subatmospheric pressures and temperatures of 430° C. to 540° C. (about 800° F. to 1000° F.) to avoid polymerization of the product. It is now possible to operate at slightly higher temperatures and much more favorable pressures of atmospheric or higher, allowing some dimerization to take place, and finally depolymerizing the dimer.

A new field in cracking for production of the lower boiling dienes, aromatic type hydrocarbons, and/or high octane gasoline is opened up. If high yields of aromatics or dienes are desired, it is now customary to crack hydrocarbon stocks thermally at temperatures of about 650° C. to 1100° C. (about 1200° F. to 2000° F.) and pressures far below atmospheric.

According to this invention, such cracking may be carried out at higher pressures, about atmospheric, whereby the diene dimers are also formed. The product may then be separated into a fraction boiling below about 65° C. (150° F.) and a higher boiling fraction. The dienes in the first fraction may then be concentrated by dimerizing, fractionating and depolymerizing as described in (1) above. By subjecting the second fraction (which contains all the aromatics) to a depolymerizing operation as described below the dimers present may be depolymerized to monomers. This treatment will concentrate the aromatics also. If stable high octane gasoline is desired, the usual cracked gasoline may be subjected to dimerizing conditions to form more stable dimers or codimers from the more reactive dienes.

Another application of the invention to cracked gasoline production may be used in conjunction with a widely used method of treating cracked gasoline. It is frequently the practice to split the raw, stabilized cracked gasoline into two fractions, a light one boiling below about 120° C. (about 200° F. to 250° F.), and a heavy one boiling above 200° F. to 250° F. The heavy fraction is then given a refining treatment such as acid treatment followed by redistillation, and the light fraction is merely caustic washed to reduce its mercaptan content, since the bulk of the mercaptans, including the more caustic soluble mercaptans, are concentrated in this light fraction. Acid treatment of this light fraction is usually omitted, because it entails loss of mono-olefins, which are of excellent anti-knock rating. This light fraction, however, does contain some of the diene monomers of this invention, and it is a part of this invention to subject such a fraction to dimerizing conditions, fractionating off the dimers, which may be subsequently depolymerized to obtain diene concentrates. This process not only provides for segregation of dienes or dimers, but also improves the gum stability of the light fraction without removing the high octane mono-olefins. In carrying out the combination process of the above paragraphs, the operations should be so designed as to constitute a single correlated unit, affording maximum efficiency of heat ultilization with minimum opportunity for undesired side reactions.

The conditions favorable for the dimerization reaction are in general moderate temperatures in the region of 300° C. to 600° C., pressures above about 50 lb. gauge, and moderate contact times of a fraction of a second to several minutes, depending on the concentration of diene in the feed stock and the temperature. Low diene concentrations in the feed stock generally make necessary longer contact times and higher pressures. Low temperatures also require longer contact times.

The butadiene in the following specific gas mixtures was converted to dimer at the conditions shown, using the apparatus indicated below:

| Mixture, wt. percent | Temperature, ° C. | Pressure, lb. ga. | Time, min. |
|---|---|---|---|
| 20% butadiene, 80% isobutene | 250 | 2,900 | 180 |
| 20% butadiene, 80% 2-butene | 400 | 1,800 | 3 |
| 20% butadiene, 80% 2-butene | 400 | 900 | 3 |
| 20% butadiene, 80% 2-butene | 400 | 450 | 3 |
| 40% butadiene, 60% mixed butenes and butanes | 300 | 1,000 | 4 |
| 5% butadiene, 95% butene-2 | 400 | 1,800 | 3 |
| 50% butadiene, 50% isobutene | 600 | 2,000 | 0.01 |
| 70% butadiene, 30% mixed butenes | 500 | 50 | 1 |

The reaction times shown above are in every case except the last two, somewhat longer than the true reaction times, since these operations were conducted in an autoclave dipped into a heating bath, and the reaction times shown were the elapsed times from entry of the bomb into the bath to removal of the bomb from the bath. The last two operations were conducted in a heated tube, and the time at the temperature was calculated. There was no observable reaction of the mono-olefins. Similar conditions are suitable for dimerizing the other conjugated dienes. It should be noted that the limiting conditions for the dimerizing reaction as set up above must not be construed too rigidly, since the results of the first operation as tabulated above show that dimerization will take place under conditions outside the ranges specified, although the reaction times required may be undesirably long.

The conditions favorable for depolymerization of the dimer are in general high temperatures in the region of 600° C. to 1000° C., total low pressures or partial pressures, anywhere below atmospheric, attained by vacuum or by the presence of inert gases such as steam, flue gas, etc., and extremely short contact times in the region of about 5 seconds or less, such as down to about 1/100 of a second or possibly less in some cases, using the shorter contact times at the higher temperatures, and in all cases having a very rapid heating to temperatures and extremely rapid quenching to below about 300° C. For example, by passing a mixture of butadiene dimer and water through a stainless steel tube at a temperture of 700° C., a partial pressure of about one-sixth atmosphere, and a contact time of about 3 seconds, with only a moderately rapid quench (cooling to below 300° C. in about 0.5 second), the total product gases other than water contained over 80% butadiene, the C4 fraction itself consisting of about 10% butanes, no butenes, and 90% butadiene. At shorter contact times with a more rapid quench, it is possible to obtain practically quantitative yields of butadiene from the dimer.

It is not necessary to add catalyst either in the dimerization or the polymerization.

The dienes referred to in this invention are in general the conjugated dienes, (the doubly bonded carbon atoms being separated by a singly pair of carbon atoms, such as

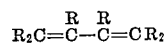

of either cyclic or acyclic structure, and of relatively low molecular weight, i. e., containing less than about 7 carbon atoms. Dienes which are not conjugated are frequently isomerized to the conjugated form under the conditions indicated above for the dimerizing reaction. It is possible to apply the invention therefore also to those non-conjugated dienes which readily isomerize to conjugated dienes, and where "conjugated dienes" are specified in this application these are meant to include those dienes which readily isomerize to the conjugated type under the condition of the reaction in question.

The dienes of this invention boil within the range of about −20° C. to +120° C. (0° F. to 250° F.). The preferred group according to this invention is the group of the simpler, lower boiling ones, consisting of butadiene, isoprene and cyclopentadiene, which boil at about −5° C., 34° C., and 43° C. respectively.

Beside dimerizing the dienes themselves, it is also possible to co-dimerize two or more different conjugated dienes, and to depolymerize the codimers again to the simple dienes, using the same general conditions outlined above. Wherever more than one diene is involved in the processes of this application, the word "dimers" shall be construed to include codimers also unless otherwise specified.

It is desirable that the feed stock to be dimerized contain no large amounts of hydrogen or hydrogen sulfide because of possible side reactions, but inert materials such as nitrogen, etc., are not harmful. Thus a wide variety of liquid or gaseous mixtures containing the conjugated dienes of this invention may be "dimerized" and the products may be fractionated to obtain a fraction free from conjugated dienes, and a fraction containing the dimers in concentrated form. From the latter fraction, the concentrated original dienes may be obtained by depolymerization, finally segregating nearly pure individual dienes from the depolymerization product by fractionation. There are many obvious modifications of this and the other processes mentioned in this application which are to be considered parts of the invention as covered by the following claims.

We claim:

1. A thermal process for producing conjugated dienes boiling below about 43° C., in which petroleum hydrocarbon fractions are cracked at temperatures of about 650° C., to 1100° C. and partial pressures of at least atmospheric, whereby both the desired dienes and their dimers are produced; the product is separated into two fractions, the first one boiling below about 65° C. and the second one boiling above about 65° C.; and the second fraction is subjected to a temperature of 600° C. to 1000° C. at subatmospheric pressures with a contact time of about 0.01 to 5 seconds, thereafter quenching the reaction by cooling the reaction product to a temperature below about 300° C. within about 0.5 second.

2. A process according to claim 1 in which the diene is butadiene.

3. process according to claim 1 in which the diene is isoprene.

4. A process according to claim 1 in which the diene is cyclopentadiene.

5. A process for producing butadiene which comprises subjecting a hydrocarbon mixture comprising butanes and butenes to contact with a catalyst at an elevated temperature between about 430° C. and 540° C. and a partial pressure greater than about one atmosphere in the absence of added hydrogen, whereby the hydrocarbons are dehydrogenated and both butadiene and its dimer are produced concurrently, and thereafter the dimer is depolymerized by subjecting it to a temperature of 600° C. to 1000° C. at subatmospheric pressures with a contact time of about 0.01 to 5 seconds, thereafter quenching the reaction by cooling the reaction products to a temperature below about 300° C. within about 0.5 second.

THOMAS F. DOUMANI.
ROLAND DEERY.